(12) United States Patent
Yeh

(10) Patent No.: US 7,828,447 B2
(45) Date of Patent: Nov. 9, 2010

(54) PROJECTOR WITH A REMOVABLE COLOR WHEEL

(75) Inventor: Wen-Pin Yeh, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 464 days.

(21) Appl. No.: 12/039,016

(22) Filed: Feb. 28, 2008

(65) Prior Publication Data

US 2009/0109407 A1 Apr. 30, 2009

(30) Foreign Application Priority Data

Oct. 30, 2007 (CN) .................. 2007 1 0202310

(51) Int. Cl.
*G03B 21/14* (2006.01)
*G03B 21/22* (2006.01)
*G02B 5/20* (2006.01)
*H04N 9/083* (2006.01)

(52) U.S. Cl. .................. 353/84; 353/119; 353/20; 359/502; 359/723; 348/270; 348/743

(58) Field of Classification Search .................. 353/84, 353/119, 20; 359/502, 723; 348/270, 743
See application file for complete search history.

(56) References Cited

U.S. PATENT DOCUMENTS

| 6,394,610 | B2 | 5/2002 | Rodriguez, Jr. | |
|---|---|---|---|---|
| 6,755,554 | B2* | 6/2004 | Ohmae et al. | 362/293 |
| 6,971,752 | B2* | 12/2005 | Lee | 353/84 |
| 7,347,568 | B2* | 3/2008 | Jin | 353/84 |
| 2003/0214740 | A1* | 11/2003 | Wong et al. | 359/892 |

* cited by examiner

*Primary Examiner*—Georgia Y Epps
*Assistant Examiner*—Magda Cruz
(74) *Attorney, Agent, or Firm*—Andrew C. Cheng

(57) ABSTRACT

A projector includes a light-source unit, a color wheel, and a connecting portion. The light-source unit with a first support structure is configured for providing light beams. The color wheel includes a color filter, a rotating portion, a motor and a second support structure. The color filter is rotatable together with the rotating portion driven by the motor, which is fixed on the second support structure. The connecting portion is configured for connecting the first and second support structures together and aligning the light-source unit with the color wheel.

10 Claims, 2 Drawing Sheets

PROJECTOR WITH A REMOVABLE COLOR WHEEL

TECHNICAL FIELD

The present invention relates to a projection display device and, particularly, to a projector with integrated color wheel and light-source unit.

DESCRIPTION OF RELATED ART

Hitherto, a Digital Light Processing (DLP) projector has been known which includes a light-source unit having a light source, a color wheel for separating light beams emitted from the light source into three colors, a digital micromirror device (DMD) for forming an optical image according to image information by using light beams separated by the color wheel, a projection lens for enlarging and projecting the optical image, and an outer casing for housing these components. Such projectors are widely used for multimedia presentations at conferences, academic meetings, exhibitions, and the like.

A related DLP projector usually includes two units, a light-source unit, and an optical engine. The light-source unit usually can be replaced by users, but the optical engine with a color wheel, a DMD, and a projection lens therein usually cannot be disassembled by common users, so the color wheel cannot be replaced by users. However, every color wheel includes a motor and a color filter, the motor usually has a relatively shorter life than other components insides the optical engine. And the result is that the common user can do nothing when the motor of the color wheel inside the optical engine becomes disabled.

What is needed, therefore, is a color wheel which can be easily replaced by users.

SUMMARY

In accordance with one present embodiment, a projector includes a light-source unit, a color wheel, and a connecting portion. The light-source unit with a first support structure is configured for providing light beams. The color wheel includes a color filter, a rotating portion, a motor and a second support structure. The color filter is rotatable together with the rotating portion driven by the motor, which is fixed on the second support structure. The connecting portion is configured for connecting the first and second support structures together and aligning the light-source unit with the color wheel.

BRIEF DESCRIPTION OF THE DRAWING

Many aspects of the present projector can be better understood with reference to the following drawings. The components in the drawing are not necessarily drawn to scale, the emphasis instead being placed upon clearly illustrating the principles of the present projector. Moreover, in the drawings, like reference numerals designate corresponding parts throughout the several views.

DETAILED DESCRIPTION OF THE EMBODIMENTS

Embodiments will now be described in detail below, with reference to the drawings.

Figure 1:
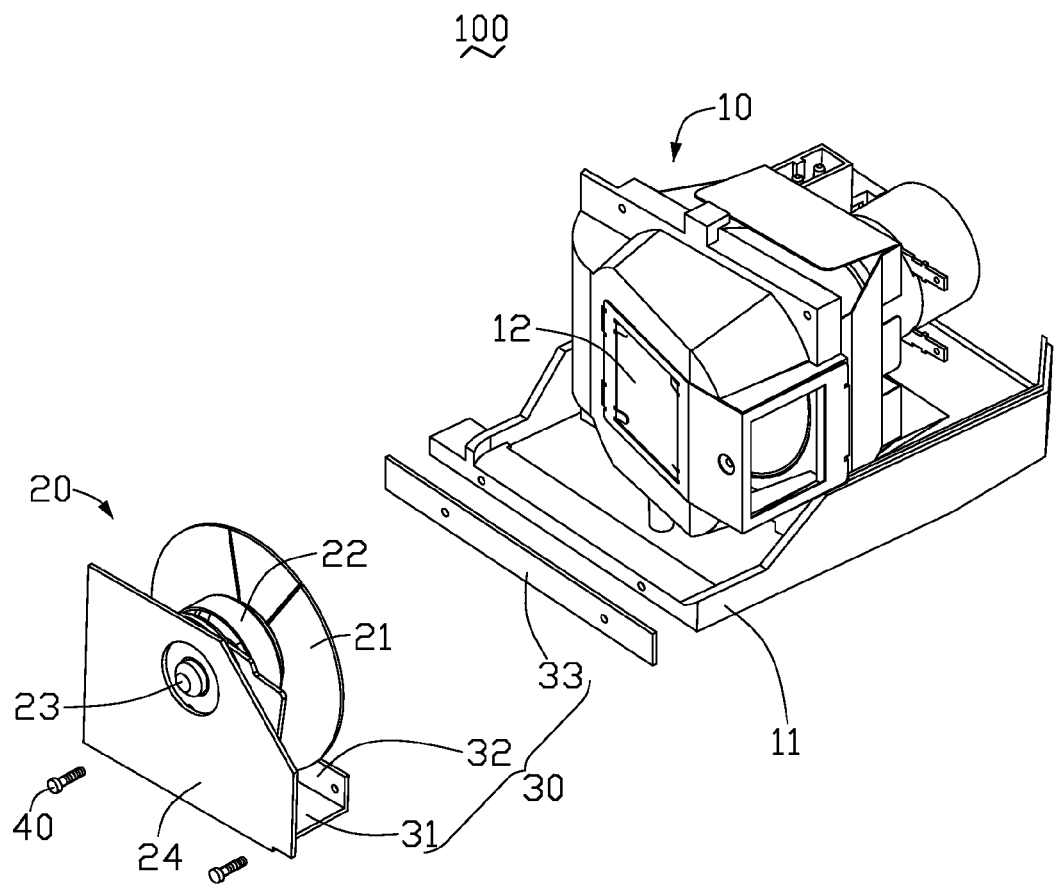
FIG. 1 is an exploded view of a projector according to a present embodiment.
Figure 2:
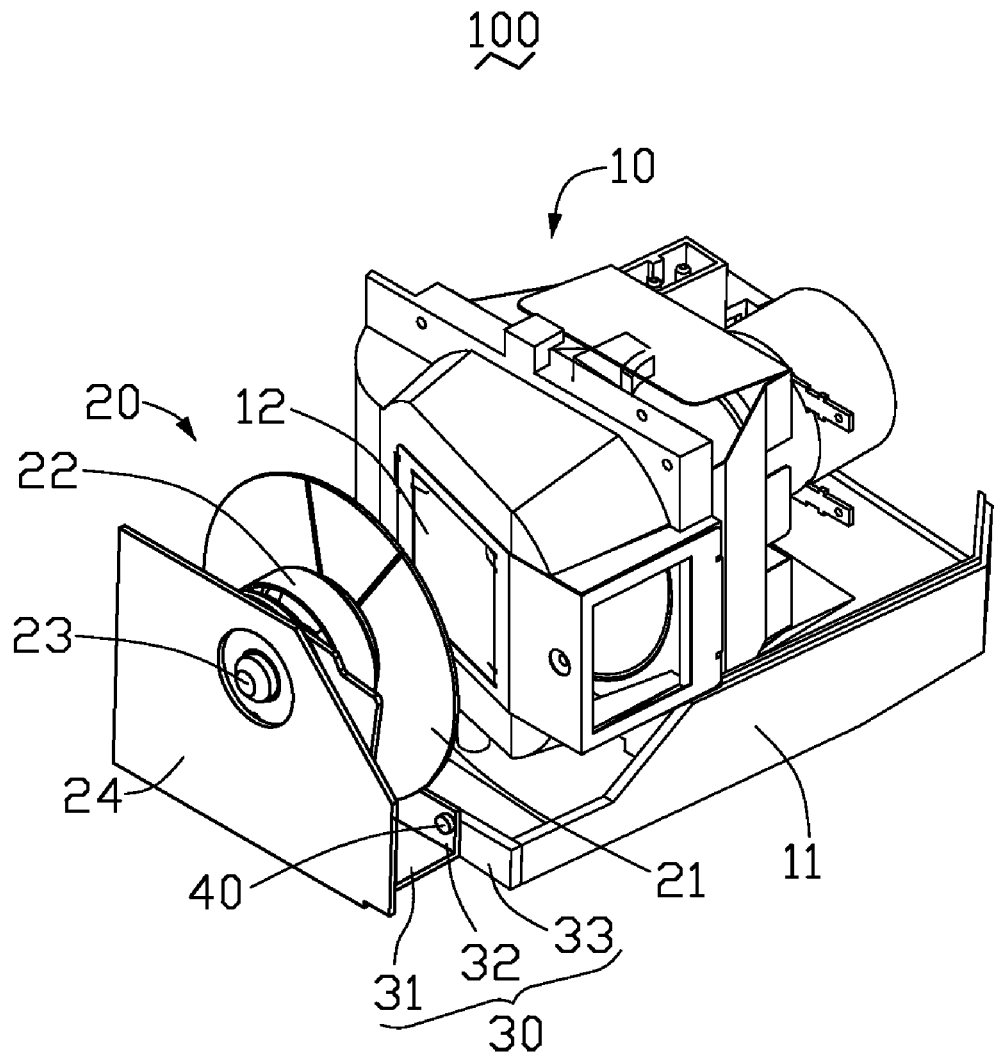
FIG. 2 is a perspective assembled view of the projector of FIG. 1.

Referring to FIG. 1 and FIG. 2, a projector 100 according to a present embodiment includes a light-source unit 10, a color wheel 20, a connecting portion 30, and an optical engine (not shown) with a DMD and a projection lens received therein.

The light-source unit 10 has a lamp (not visible) received therein and a first support structure 11 for fixing the light-source unit 10. The light-source unit 10 is used for providing light beams for the projector 100 and can be replaced by users as needed. The lamp in the light-source unit 10 can emit light out of the light-source unit 10 through a window 12, which is aligned with the color wheel 20.

The color wheel 20 includes a color filter 21, a rotating portion 22, a motor 23, and a second support structure 24.

The color filter 21 is secured on the rotating portion 22. The color filter 21 is configured for separating light beams emitted from the light-source unit 10. The color filter 21 has a transparent plate-configuration, beneficially, made from glass or quartz. The color filter 21 includes a plurality of filter segments, such as a red filter segment, a green filter segment, and a blue filter segment.

The motor 23 is used for rotating the rotating portion 22 with the color filter 21 secured thereon. Thereby, the color filter 21 can rotate about its axis. The second support structure 24 is configured for fixing the motor 23.

The connecting portion 30 is configured for connecting and fixing the first support structure 11 of the light-source unit 10 to the second support structure 24 of the color wheel 20. In the present embodiment, the connecting portion 30 is integrally formed with the second support structure 24 of the color wheel 20. The connecting portion 30 has an extending portion 31 and a fixing portion 32. The extending portion 31 extends from the second support structure 24 of the color wheel 20 along the direction from the second support structure 24 of the color wheel 20 to the first support structure 11 of the light-source unit 10. The fixing portion 32 extends from an end of the extending portion 31 along the direction perpendicular to the extending portion 31. The fixing portion 32 is configured for securing to the first support structure 11 of the light-source unit 10. In the present embodiment, the fixing portion 32 is secured to the first support structure 11 with screws 40.

In the present embodiment, the connecting portion 30 further includes a cushion 33 disposed between the fixing portion 32 and the first support structure 11 of the light-source unit 10. The cushion 33 is made of a resilient material used as a shock absorber for absorbing shock caused by the motor 23. It is understood that the connecting portion 30 can also be integrally formed with the first support structure 11 of the light-source unit 10 instead of integrally formed with the second support structure 24 of the color wheel 20, or the first support structure 11, the second support structure 24, and the connecting portion 30 are formed integrally.

The projector 100 has a connecting portion 30 fixing the color wheel 20 to the light-source unit 10, so the color wheel 20 can be replaced by users without disassembling the optical engine of the projector 100. That will be convenient for users, and the projector 100 can use motors with relatively short lifespans in the color wheel 20, which can reduce the cost of the projector 100.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A projector comprising:
a light-source unit with a first support structure for providing light beams;
a color wheel comprising a color filter, a rotating portion, a motor, and a second support structure, the color filter being rotatable together with the rotating portion driven by the motor, which is fixed on the second support structure; and
a connecting portion for connecting the first support structure and the second support structure together.

2. The projector as claimed in claim 1, wherein the color filter includes a red filter segment, a green filter segment, and a blue filter segment.

3. The projector as claimed in claim 1, wherein the color filter has a transparent plate-configuration and is made from one of glass and quartz.

4. The projector as claimed in claim 1, wherein the connecting portion is integrally formed with the second support structure.

5. The projector as claimed in claim 1, wherein the connecting portion has an extending portion and a fixing portion, the extending portion extending from the second support structure along the direction from the second support structure to the first support structure, the fixing portion extending from an end of the extending portion along the direction perpendicular to the extending portion for securing to the first support structure.

6. The projector as claimed in claim 5, wherein the fixing portion is secured to the first support structure with screws.

7. The projector as claimed in claim 5, wherein the connecting portion further includes a cushion disposed between the fixing portion and the first support structure.

8. The projector as claimed in claim 7, wherein the cushion is made of a resilient material.

9. The projector as claimed in claim 1, wherein the connecting portion is integrally formed with the first support structure.

10. The projector as claimed in claim 1, wherein the first support structure, the second support structure, and the connecting portion are formed integrally.

* * * * *